(12) United States Patent
Wellhoefer et al.

(10) Patent No.: US 7,653,468 B2
(45) Date of Patent: Jan. 26, 2010

(54) CONTROL UNIT AND ACCELERATION SENSOR SYSTEM

(75) Inventors: Matthias Wellhoefer, Stuttgart (DE); Volker Frese, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 10/577,906

(22) PCT Filed: Jul. 22, 2004

(86) PCT No.: PCT/DE2004/001619

§ 371 (c)(1),
(2), (4) Date: Dec. 8, 2006

(87) PCT Pub. No.: WO2005/044638

PCT Pub. Date: May 19, 2005

(65) Prior Publication Data

US 2007/0079655 A1    Apr. 12, 2007

(30) Foreign Application Priority Data

Oct. 31, 2003    (DE) ................................ 103 50 919

(51) Int. Cl.
*B60R 22/00* (2006.01)
*G06F 7/00* (2006.01)

(52) U.S. Cl. ............................ 701/46; 701/47; 180/282; 280/735; 340/438; 73/514.16

(58) Field of Classification Search .................... 701/46, 701/47, 35
See application file for complete search history.

(56) References Cited

U.S. PATENT DOCUMENTS

| 4,405,899 | A | * | 9/1983 | Wurzburg | ................... | 330/107 |
|---|---|---|---|---|---|---|
| 5,083,276 | A | * | 1/1992 | Okano et al. | ................... | 701/46 |
| 5,182,459 | A | * | 1/1993 | Okano et al. | ............... | 307/10.1 |
| 5,431,441 | A | * | 7/1995 | Okano | ....................... | 280/735 |
| 5,440,485 | A | * | 8/1995 | Okimoto et al. | ............... | 701/46 |
| 5,657,831 | A | | 8/1997 | Furui | | |
| 6,178,820 | B1 | | 1/2001 | Lekkala et al. | | |
| 6,220,628 | B1 | | 4/2001 | Konja | | |
| 6,636,791 | B2 | * | 10/2003 | Okada | ........................ | 701/35 |
| 6,970,778 | B1 | * | 11/2005 | Feser et al. | .................... | 701/45 |
| 2004/0094349 | A1 | * | 5/2004 | Schumacher et al. | ......... | 180/274 |
| 2006/0167603 | A1 | * | 7/2006 | Brandl et al. | .................. | 701/45 |

FOREIGN PATENT DOCUMENTS

DE    40 16 644    11/1991

(Continued)

OTHER PUBLICATIONS

Press Release—"GE Energy Introduces New Vibration Transducer". Sep. 22, 2004.*

*Primary Examiner*—Thomas G Black
*Assistant Examiner*—Lin B Olsen
(74) *Attorney, Agent, or Firm*—Kenyon & Kenyon LLP

(57) ABSTRACT

Described is a control unit and an acceleration sensor system, the control unit having an electronic safety switch which, as a function of a signal of an acceleration sensor system, releases output stages for actuating passenger protection means independently of a processor and the processor actuates the output stages as a function of the signal. The safety switch analyzes an integrated acceleration signal.

6 Claims, 2 Drawing Sheets

FOREIGN PATENT DOCUMENTS

| | | |
|---|---|---|
| DE | 41 17 811 | 12/1992 |
| DE | 195 47 307 | 1/1997 |
| DE | 100 57 916 | 5/2002 |
| WO | 01 94158 | 12/2001 |
| WO | 02 04257 | 1/2002 |
| WO | WO 02/066995 * | 8/2002 |

* cited by examiner

CONTROL UNIT AND ACCELERATION SENSOR SYSTEM

FIELD OF THE INVENTION

The present invention is directed to a control unit and an acceleration sensor system.

BACKGROUND INFORMATION

A control unit for actuating passenger protection means having an electronic safety switch is known from German Patent No. 100 57 916, the safety switch, independently of a processor, releasing output stages as a function of a signal of an acceleration sensor system. As a function of this signal, the processor determines whether the output stages and thus the passenger protection means are actuated, thereby establishing a hardware-independent plausibility check and redundancy.

SUMMARY OF THE INVENTION

The control unit and the acceleration sensor system according to the present invention have the advantage over the related art that the safety switch already analyzes the integrated acceleration signal, since the acceleration sensor system itself integrates the acceleration signal. For this purpose, an integrator, which integrates either one or multiple acceleration signals generated by the acceleration sensor system, is advantageously present in the acceleration sensor system. This has the advantage that the integrator may be omitted from the processor, i.e., the microcontroller in the control unit, thereby making a simpler design possible. Moreover, the safety switch may already analyze the integrated acceleration signal, thereby permitting a better analysis vis-à-vis the one acceleration signal. The presence of an integrator or a filter in the safety switch itself, for smoothing the acceleration signal, is also avoided. Primarily, it is thereby achieved that the plausibility for a possible crash may be determined with greater accuracy. If the one acceleration signal is analyzed by the safety switch, threshold values, with which the safety switch compares the signal, must be set as high as possible so that momentary acceleration peaks do not result in the release of the output stages in the control unit. However, it is possible in the integrated acceleration signal to set the threshold values correspondingly lower in order to achieve a more accurate plausibility check so that in triggering events, which do not involve such a high acceleration signal, the output stages are still released.

It is particularly advantageous that the acceleration sensor system itself has an integrator and that this pre-processing is accommodated in one housing. In addition, high pass filtering may also be provided, which is implemented as either analog or digital. High pass filtering is advantageously present in order to compensate for a possible offset drift of the acceleration sensor system. For this purpose, a high pass filter of the first order having 1 Hz to 2 Hz may be connected downstream, for example. This may be useful when driving on gravel in particular.

DETAILED DESCRIPTION

Redundant analysis of sensor signals in airbag control units has always been carried out in order to achieve a high level of safety in the actuation of passenger protection means such as airbags, seatbelt tensioners, or roll bars. Previously, mechanical switches were predominantly used, which were situated in the current circuit to the output stages, for example, and completed this current circuit at a correspondingly high acceleration. However, electronic safety switches are also increasingly used. These electronic safety switches have electronic structures which enable the analysis of sensor signals. These electronic structures are therefore similar to a switching unit or arithmetic unit.

It is provided according to the present invention that the acceleration sensor systems already output integrated acceleration signals which the safety switch subsequently analyzes in parallel to the processor. The processor or microcontroller is saved the complex function of integrating the acceleration signals so that it may have a simpler design and, based on the integrated acceleration signals, the safety switch is able to analyze the sensor signals more accurately to determine whether or not a crash event exists.

Figure 1:
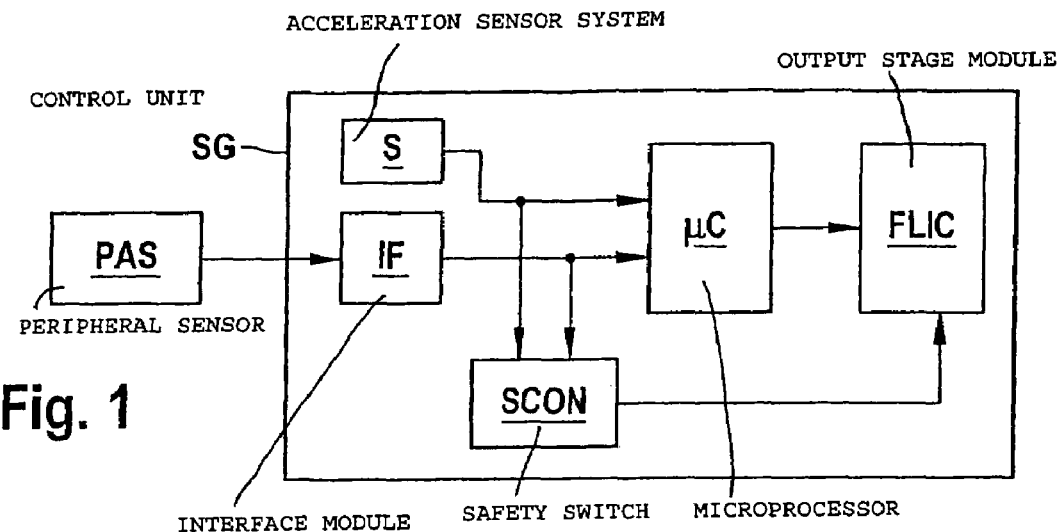
FIG. 1 shows a block diagram of the control unit according to the present invention

FIG. 1 shows a block diagram of the control unit according to the present invention. An acceleration sensor system S, which is able to detect the acceleration at least in the vehicle longitudinal direction, is situated in the housing of control unit SG. It is possible that acceleration sensor system S may also detect accelerations in the vehicle transverse direction. For this purpose, sensor elements may be sensitive in the vehicle longitudinal direction and the vehicle transverse direction or angular thereto. Sensors which are acceleration-sensitive in the vehicle vertical direction may also be used. These could be installed in the B and/or C-pillar for rollover detection, for example. Sensor S is connected to a microcontroller μC and an electronic safety switch SCON via a data output. Microcontroller μC receives signals from an interface module IF via a second data input. Microcontroller μC is connected to an output stage module FLIC via a data output.

Communication between the modules in control unit SG and processor μC preferably takes place via the SPI (serial peripheral interface bus). This bus is configured as a master/slave bus, microcontroller μC being the master and the connected modules being the slaves. The signals from interface module IF are sent not only to microcontroller μC but also to a second data input of safety switch SCON. Safety switch SCON is connected to output stage module FLIC via a data output. Outside of control unit SG, a peripheral sensor PAS is connected to interface module IF. Only a single module PAS is shown here as an example; however, many more modules may be installed in the vehicle. Acceleration sensor system PAS, for example, may be situated in the B-pillar for side impact detection and also on the radiator grill as an upfront sensor. For the sake of simplicity, additional modules, which are also situated in control unit SG but are nonessential for the description of the present invention, are not shown. The triggering circuits for the individual airbags and seat belt tensioners as well as roll bars are then connected to output stage module FLIC.

The function is as follows:

Accelerations, which the vehicle experiences due to an accident, are measured via sensors S and PAS and these sensor signals are then output by sensors S and PAS as integrated acceleration signals. The sensor signals from sensors S and PAS are analyzed by processor µC and safety module SCON, independently of one another. A complex triggering algorithm runs on processor µC which, based on a signal analysis, determines whether and which restraining means are to be triggered. Parallel to this action, safety module SCON analyzes the sensor signals using straightforward, fixed threshold values. It is possible that a straightforward algorithm also runs on safety module SCON. Furthermore, it is possible that safety module SCON executes watchdog functions for processor µC. However, these are not illustrated here. It is essential for the present invention that sensors S and PAS output integrated acceleration signals so that processor µC does not have to carry out the integration itself and safety module SCON is able to carry out the threshold value comparison based on these integrated acceleration signals and is therefore able to carry out a more accurate plausibility check of a triggering decision by processor µC. If safety module SCON recognizes this triggering event it releases output stage module FLIC so that, at a firing command of processor µC, the output stages may be completed and the igniting current may flow into the triggering circuits.

Figure 2:
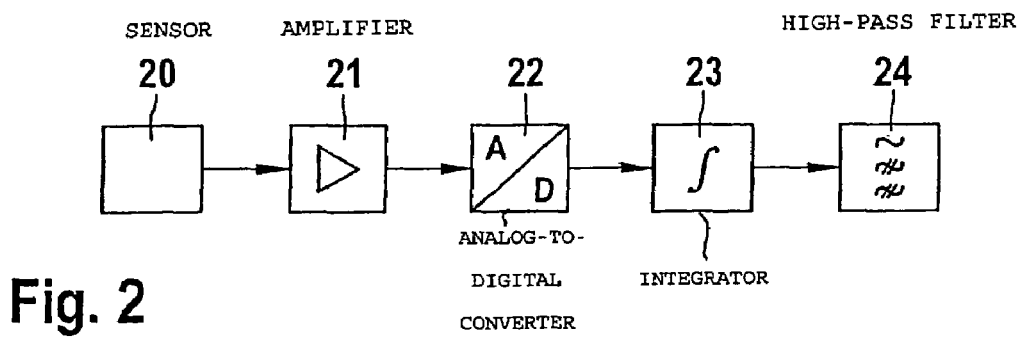
FIG. 2 shows a first block diagram of the acceleration sensor system

In a first exemplary embodiment, FIG. 2 illustrates the internal structure of sensors S and PAS. Sensor element 20 outputs signals to an amplifier 21 which amplifies these signals. Sensor element 20 may be a diaphragm or a finger structure. However, other concepts for detecting the acceleration are also possible. Amplifier 21 outputs the amplified sensor signal to an analog-to-digital converter 22. The analog-to-digital converter carries out a digitization of the sensor signal. This is subsequently digitally integrated in module 23. Electronic high pass filtering takes place in module 24. This high pass filtering is necessary in order to compensate for a possible offset drift of the sensor. In the absence of such a high pass, the sensor's offset drift could result in a triggering signal without a triggering event existing.

Figure 3:
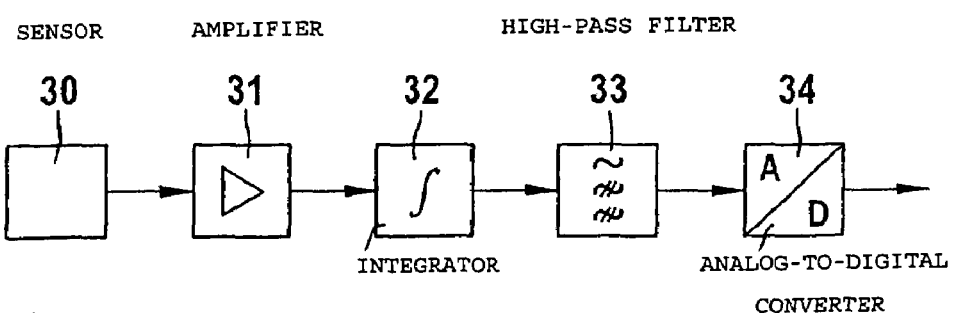
FIG. 3 shows a second block diagram of the acceleration sensor system

In a second exemplary embodiment, FIG. 3 illustrates the internal structure of sensors S and PAS according to the present invention. A sensor element 30, which corresponds to sensor element 20, is connected to an amplifier 31, which in turn corresponds to amplifier 21. The amplified output signal of amplifier 31 is integrated in an analog manner by an integrator 32 and subsequently filtered through an analog high pass filter in a high pass filter 33 in order to eliminate the offset drift. The signal, processed in this way, is subsequently digitized in an analog-to-digital converter 34 so that it is able to be directly output by sensor S or sensor PAS and analyzed by processor µC and safety switch SCON. Additional hybrids between the examples from FIGS. 2 and 3 are possible.

Figure 4:
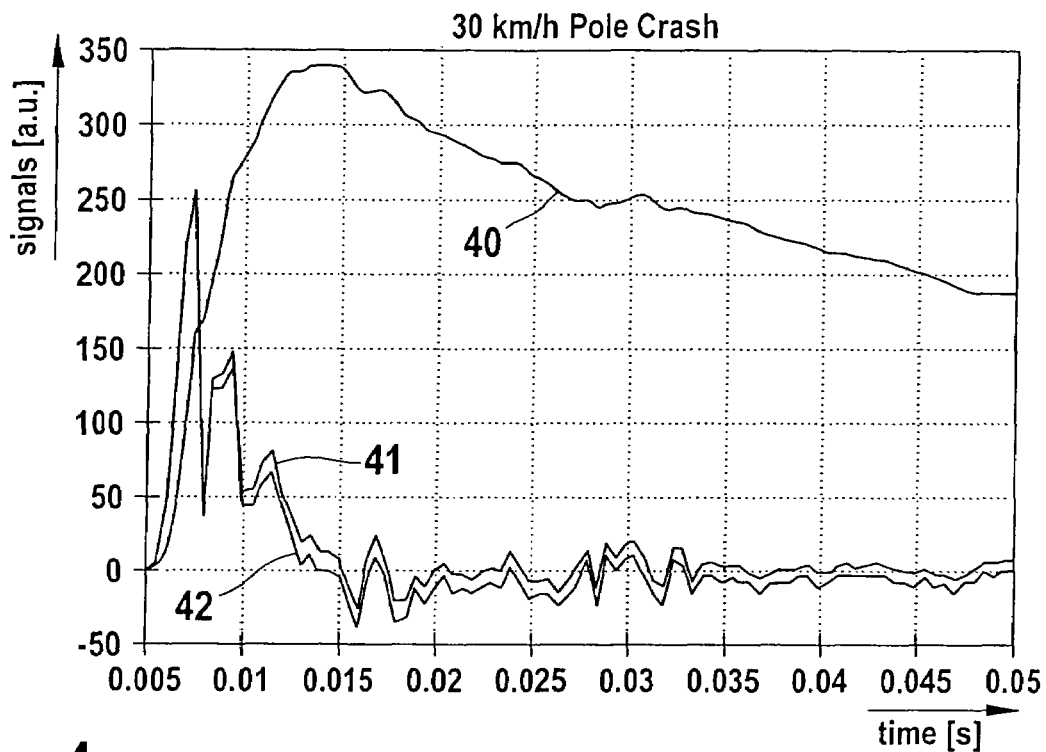
FIG. 4 shows a signal/time diagram.

The sensor signal of sensors S and PAS in the event of a crash is explained in FIG. 4 based on a first signal/time diagram. The time is shown on the abscissa and the signal is shown on the ordinate in arbitrary units. In this instance it is a 30 km/h crash with a pole. Curve 40 represents the integrated acceleration signal, while curve 41 is the derived integrated signal and curve 42 is the original acceleration signal which, however, has been filtered through a 360 Hz 3 pole Bessel filter.

Figure 5:
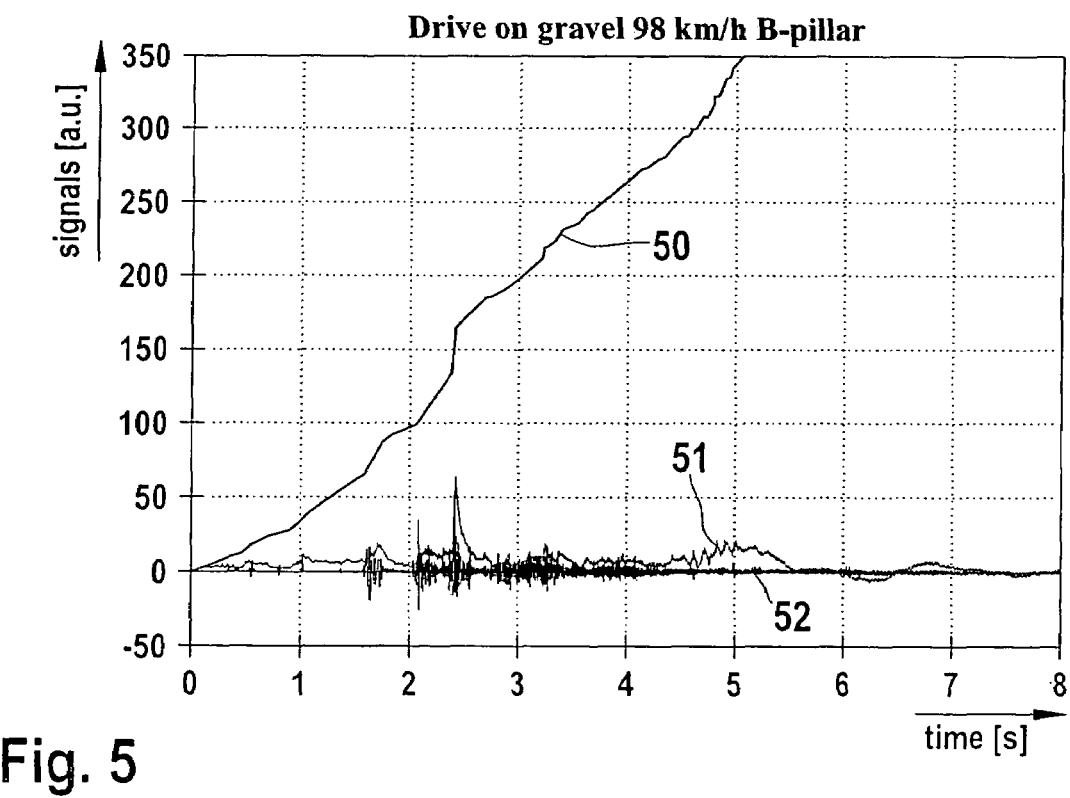
FIG. 5 shows another signal/time diagram.

Original sensor signal 42 is thus filtered using the 360 Hz low pass and is sampled at 2 kHz. The values are subsequently added and high pass-filtered at 2 Hz. The signal is then transmitted with a resolution of ±480 LSB (least significant bit) (10 bit). Microcontroller µC then internally has the possibility of drawing on the direct acceleration signal via a simple subtraction, which is signal 41. Depending on the threshold value, integrated sensor signal 40 would result in a resolution at 100 LSB to 200 LSB approximately 7 ms to 9 ms or 2 ms to 5 ms after the acceleration occurred. The original sensor signal may be reconstructed quite well, at least in the trigger-relevant part of the signal. High pass filtering subsequently results in a slight offset. High pass filtering is necessary to filter away slight sensor offset drifts. High pass filtering was checked based on driving on gravel. FIG. 5 shows the result. A signal/time diagram is also shown here in which again the time is indicated on the abscissa and arbitrary units for the signal are indicated on the ordinate. Curve 50 shows the integrated acceleration signal without high pass filtering, curve 51 shows the integrated signal with high pass filtering, and curve 52 shows the acceleration signal after low pass filtering. Curve 50 shows that, without high pass filtering, trigger-relevant signals would be generated due to the fact that the sensor's offset drift is disregarded, while with high pass filtering no trigger-relevant signals are generated, even during this drive on gravel.

What is claimed:

1. A control unit for actuating a passenger protection arrangement, comprising:
   a processor; and
   an electronic safety switch that, as a function of a signal of an acceleration sensor system, enables an output stage to be actuated by the processor, the enabling occurring independently of the processor, the processor actuating the output stage as a function of the signal, wherein the safety switch analyzes an integrated acceleration signal as the signal of the acceleration sensor system, wherein the acceleration sensor system includes an integrator for outputting the integrated acceleration signal, the integrator configured to generate the integrated acceleration signal independently of the processor.

2. The control unit as recited in claim 1, further comprising:
   a high pass filter for filtering the integrated acceleration signal.

3. The control unit as recited in claim 1, wherein the safety switch executes watchdog functions for the processor.

4. The control unit as recited in claim 1, wherein the processor analyzes the integrated acceleration signal in parallel with the electronic safety switch, which performs a plausibility check on a decision by the processor to actuate the output stage as a function of the integrated acceleration signal, the electronic safety switch disabling the output stage from being actuated by the processor when the plausibility check fails.

5. The control unit as recited in claim 4, wherein the electronic safety switch utilizes a different analysis technique from that of the processor in analyzing the integrated acceleration signal.

6. The control unit as recited in claim 5, wherein the analysis technique utilized by the electronic safety switch includes comparisons to fixed threshold values.

* * * * *

UNITED STATES PATENT AND TRADEMARK OFFICE
CERTIFICATE OF CORRECTION

PATENT NO. : 7,653,468 B2 Page 1 of 1
APPLICATION NO. : 10/577906
DATED : January 26, 2010
INVENTOR(S) : Wellhoefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 60 days.

Signed and Sealed this

Twenty-third Day of November, 2010

David J. Kappos
*Director of the United States Patent and Trademark Office*